United States Patent
Carpenter et al.

[11] Patent Number: 6,032,545
[45] Date of Patent: Mar. 7, 2000

[54] NOZZLE FLOW THRUST VECTOR MEASUREMENT

[75] Inventors: Thomas W. Carpenter, Arroyo Grande; James A. Gerhardt, Atascadero, both of Calif.

[73] Assignee: California Polytechnic State University Foundation, San Luis Obispo, Calif.

[21] Appl. No.: 09/061,727

[22] Filed: Apr. 17, 1998

[51] Int. Cl.[7] .............................. G01N 19/00; G01L 3/26; G01L 5/13

[52] U.S. Cl. ........................................ 73/865.9; 73/117.4

[58] Field of Search ................................... 73/116, 117.4, 73/147, 865.9; 440/47; 244/12.5, 52, 55; 239/265.19, 265.35

[56] References Cited

U.S. PATENT DOCUMENTS

| | | | |
|---|---|---|---|
| 3,218,849 | 11/1965 | Marvinney et al. | 73/116 |
| 3,229,515 | 1/1966 | Emery | 73/141 |
| 3,295,366 | 1/1967 | Von Pragenau et al. | 73/116 |
| 3,408,861 | 11/1968 | Webb | 73/117.4 |
| 3,449,947 | 6/1969 | Ormond | 73/117.4 |
| 3,537,303 | 11/1970 | Hecht | 73/117.4 |
| 3,552,197 | 1/1971 | Pavone et al. | 73/117.4 |
| 3,572,104 | 3/1971 | Stark | 73/117.4 |
| 3,597,968 | 8/1971 | Bon | 73/117.4 |
| 4,034,604 | 7/1977 | Decher et al. | 73/147 |
| 5,170,964 | 12/1992 | Enderle et al. | 244/52 |
| 5,545,063 | 8/1996 | Haynes | 440/47 |

FOREIGN PATENT DOCUMENTS 666459  6/1979  U.S.S.R.

OTHER PUBLICATIONS

Singnoi, "Structural Analysis of Multi–Component Vectored Thrust Jet Engine Test Stand", B.S.A.E., University of Kansas (1982) (no mo.).

Catalog of Wiancko Engineering Company, a division of Tamar Electronics Industries, Inc. received in the PTO on Jan., 20, 1964, pp. 12, 13, and 21.

Postma, "Experimental Evaluation of a Thrust Vector Load Cell"; Arnold Engineering Development Center Air Force Systems Command, Arnold Air Force Station, Tennessee (Nov., 1970).

Round, et al., "Propulsion System Technologies for Thrust Vectoring"; Rolls–Royce, Bristol, England (1987) (no mo.).

Stagner, "Evaluation of a Multi–Component Thrust Test Stand"; Aeronautical Engineering Department, California Polytechnic State University, San Luis Obispo, California (1989) (no mo.).

Killingsworth, "Survey of Open Literature Concerning Multiaxis Thrust Measurements", University of Kansas, Lawrence, Kansas (Jul., 1981).

Postma, "Vector Thrust Load Cell Feasibility Study"; Rocketdyne, Canoga Park, California Research Division, Final Report; (Apr. 1968–Jun. 1969).

*Primary Examiner*—William Oen
*Attorney, Agent, or Firm*—Fitch, Even Tabin & Flannery

[57] ABSTRACT

A nozzle flow thrust vector measurement system employs a thrust vector table, and a gas supply. The thrust vector table employs a thrust measurement table; a reference table; and at least three load cell assemblies coupled to the thrust measurement table and the reference table. The gas supply system employs a gas supply conduit substantially fixed relative to the reference table; a gas supply manifold substantially fixed relative to the thrust vector table; and a zero force connecting system coupled between the gas supply conduit and the gas supply manifold, wherein the zero force connecting system applies substantially zero net force to the gas supply manifold allowing substantially all force applied to the thrust vector table to act on said load cell assemblies.

20 Claims, 9 Drawing Sheets

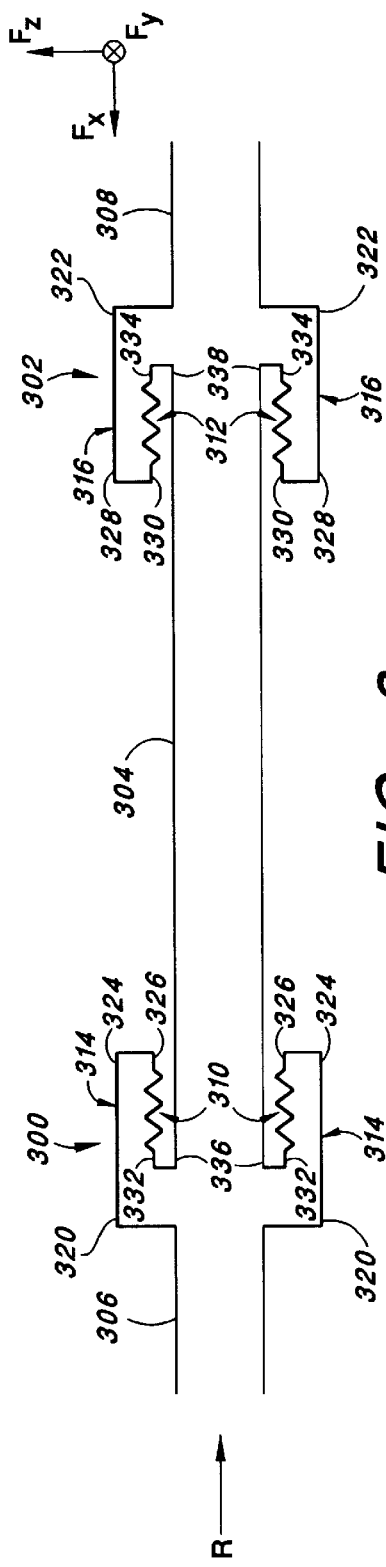
FIG. 3
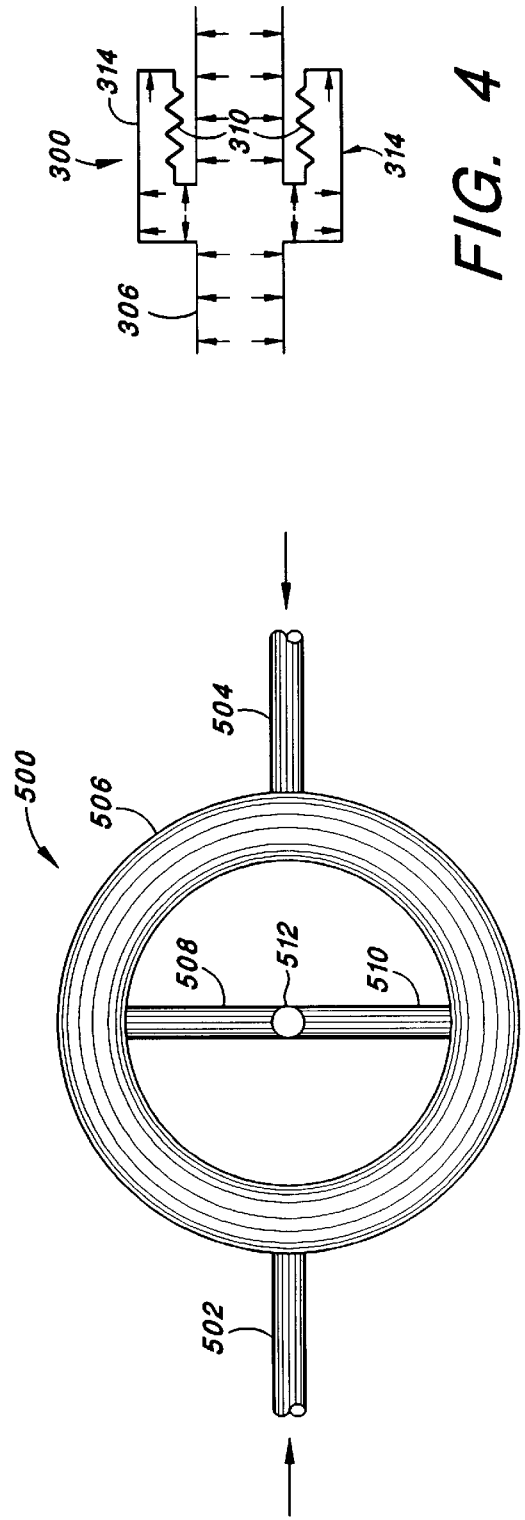
FIG. 4
FIG. 5

NOZZLE FLOW THRUST VECTOR MEASUREMENT

BACKGROUND OF THE INVENTION

The present invention relates to nozzle flow thrust vector measurement, and more particularly to nozzle flow thrust vector measurement in a nozzle flow thrust vector bench.

Aircraft jet and rocket engine thrust measurements can be carried out by mounting a test nozzle on a test stand. The test nozzle may be, for example, a 1:14 scale model of a full-size nozzle of which characteristics are to be tested. In accordance with current approaches, such test stands are supported by load cells that measure thrust forces exerted as a result of propulsion gases emitted by the nozzle. The thrust forces generated result in strains developed in the load cells themselves that are transduced into electrical quantities to provide an indication of the thrust forces being exerted by the test nozzle on the test stand as a result of the emission of the propulsion gases from the test nozzle.

For nozzle flow thrust vector measurements, it is desirable to provide an indication of any force components generated, be they in a forward direction (along a thrust axis, or z-axis), or side directions (normal to the thrust axis, or along a y-axis for pitch and along a x-axis for yaw). (Forces in side directions result, for example, when a direction of thrust is out of alignment, either intentionally or unintentionally with the thrust axis of the nozzle itself.) The force component in the forward direction and the force components in the side directions may be measured by suitable load cells coupled to the test stand, with each load cell having a load sensitive axis suitably oriented such that together the load cells provide an indication of the force component in the forward direction and the force components in the side directions.

When test nozzles with on-board propulsion, such as rocket motors or complete jet engines, are tested the use of a test stand is possible, because the only forces the test stand "sees" are those generated by the emission of the propulsion gases. Problematically, however, when small-scale models are employed, without on-board propulsion, propulsion gases must be supplied to the test nozzles from an external source. Heretofore no adequate solution has been available to the elimination of forces applied by external propulsion gas supplies to the test nozzle and in-turn to the test stand. As a result, test stands have not been satisfactory for many nozzle flow thrust vector measurements.

In another, and heretofore preferred, approach to thrust measurements, a wind tunnel sting may be employed to measure nozzle thrust. Wind tunnel stings are six-component thrust measuring devices employing strain gauges attached to a horizontal metal tube. In practice, the test nozzle is positioned on (i.e., mounted on) the metal tube, and thrust forces generated by propulsion gases escaping the test nozzle are transferred to the metal tube and thus to the strain gauges.

Wind tunnel stings are installed in most major wind tunnels at research institutions, such as universities, government sponsored laboratories and government research agencies, and are designed specifically for measuring thrust vectors generated by model aircraft output nozzle flow in a wind tunnel environment. Unfortunately, these wind tunnel stings are located in awkward horizontal positions in test sections of wind tunnels.

Wind tunnel stings are very expensive, and in fact prohibitively expensive for many researchers who would benefit from their use. For example, it is expected that the cost of a wind tunnel sting, without the ability to attach a test nozzle for nozzle flow thrust vector measurements, would be in excess of $100,000 (at the time of filing of this patent document). If one were to add nozzle flow thrust vector measurement capabilities, such a wind tunnel sting would exceed $500,000 or more in costs.

The present invention advantageously addresses the above and other needs.

SUMMARY OF THE INVENTION

The present invention advantageously addresses the needs above as well as other needs by providing an improved approach to nozzle flow thrust vector measurement in a nozzle flow thrust vector measurement bench.

The invention can be summarized, in particular embodiments, as a thrust measurement table (or nozzle flow thrust vector measurement bench) onto which a test nozzle is mounted, so as to transfer any forces acting on the test nozzle to the thrust measurement table. Ideally, the only such forces are those generated by the expulsion of propulsion gases from the test nozzle with any minor additional forces being eliminated through calibration. (Such additional forces are made a linear function of gas supply pressure by the embodiments shown herein and thus are easily eliminated by calibration.) The thrust measurement table is mounted on load cells oriented so as detect forces in a forward direction, parallel to a thrust axis of the test nozzle, and side forces, in a direction normal to the thrust axis (i.e., having pitch axis and yaw axis components). Gas under pressure is supplied to the test nozzle. A gas supply, made up of supply lines including, for example, externally pressurized gas supply bellows, and a donut-shaped (or toroidally-shaped) gas supply manifold is designed to prevent the substantial transfer of forces from the gas supply to the test nozzle. The gas supply is advantageously held in place within a frame, so as to both prevent the supply lines from expanding under gas pressure and to provide opposing forces to oppose forces generated in the supply lines. As a result of the unique gas supply employed, the only substantial forces seen by the test nozzle are those resultant from the propulsion gas emitted from the test nozzle. Gas supply forces are substantially counteracted by equal and opposite forces from the frame, with any remaining forces being eliminated through calibration, while the externally pressurized gas supply bellows do not counteract forces resultant from the propulsion gas, instead allowing such forces to be transmitted to the thrust measurement table and the load cells. Advantageously, because the gas supply forces are substantially counteracted by forces from the frame, and because the externally pressurized gas supply bellows in the embodiments described herein substantially produce only linear forces, the remaining forces are substantially linear as a function of gas supplied to the test nozzle and can thus easily be eliminated through calibration. Thus, as a result of the unique gas supply employed, the only forces translated to the thrust measurement table, and ultimately to the load cells, are those resultant from the emission of propulsion gases from the test nozzle. As a result, accurate nozzle flow thrust vector measurement can be made in a thrust measurement table environment without the transfer of gas supply forces to the test measurement table, as with prior art approaches.

In one embodiment, the present invention can be characterized as a nozzle flow thrust vector measurement system employing a thrust vector table, and a gas supply. The thrust vector table employs a thrust measurement table; a reference table; and at least three load cell assemblies coupled to the thrust measurement table and the reference table. The gas supply system employs a gas supply conduit substantially fixed relative to the reference table; a gas supply manifold substantially fixed relative to the thrust vector table; and a zero force connecting system coupled between the gas supply conduit and the gas supply manifold, wherein the zero force connecting system applies substantially zero net force to the gas supply manifold allowing substantially all force applied to the thrust vector table to act on the load cell assemblies.

In particular variations, the gas supply manifold employs a toroidal manifold body; a first inlet coupled between the zero force connecting system and the toroidal manifold body; and a first outlet coupled between the toroidal manifold body and the test nozzle. The first inlet is coupled to the toroidal manifold body, and extends radially outward from the toroidal manifold body, and the first outlet is coupled to the toroidal manifold body, and extends radially inward from the toroidal manifold body.

In a further variation, the zero force connecting system employs an externally pressurized gas supply bellows coupled to the gas supply conduit and a remainder of the zero force connecting system. The externally pressurized gas supply bellows comprises: a pressure collar coupled to the air supply manifold; and a corrugated bellows tube coupled between the pressure collar and the remainder of the remainder of the zero force connecting system.

In another variation the above-mentioned at least three load cell assemblies comprise: first, second and third load cell assemblies coupled between the thrust measurement table and the reference table, the first, second and third load cell assemblies having major axes substantially parallel with a major axis of the thrust measurement table; and fourth, fifth and sixth load cell assemblies coupled between the thrust vector table and the reference table, the fourth, fifth and sixth load cell having major axes substantially normal to a major axis of the thrust measurement table.

BRIEF DESCRIPTION OF THE DRAWINGS

The above and other aspects, features and advantages of the present invention will be more apparent from the following more particular description thereof, presented in conjunction with the following drawings wherein:

FIG. 3 is a cross-sectional view of an externally pressurized air supply bellows used in the nozzle flow thrust vector measurement bench of FIG. 1;

FIG. 4 is a partial cross-sectional view of the externally pressurized air supply bellows, as shown in FIG. 3, in an externally compressed state;

FIG. 5 is a toroidal air supply manifold used in the nozzle flow thrust vector measurement bench of FIG. 1;

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
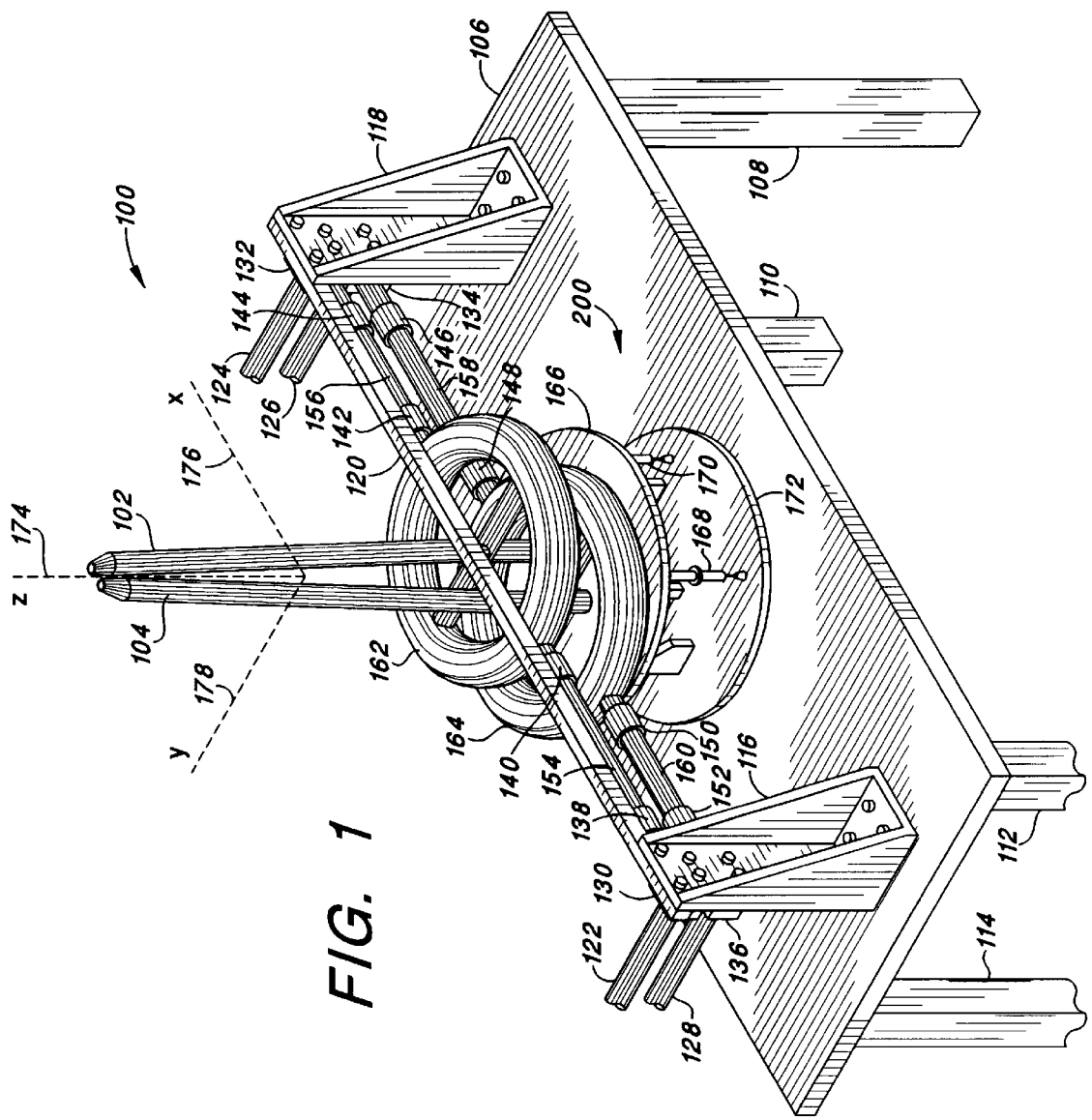
FIG. 1 is a perspective view of a nozzle flow thrust vector measurement bench in accordance with one embodiment of the present invention, with a side-by-side pair of nozzles positioned for testing.

Referring first to FIG. 1, a perspective view is shown of a nozzle flow thrust vector measurement bench 100 in accordance with one embodiment of the present invention, with a side-by-side pair of nozzles 102, 104 positioned for testing.

Shown are a steel table 106 supported on four legs 108, 110, 112, 114, such as steel or wooden legs, a pair of support braces 116, 118, a strut 120, four supply hoses 122, 124, 126, 128, four ELM fittings 130, 132, 134, 136, eight externally pressurized air supply bellows 138, 140, 142, 144, 146, 148, 150, 152, four connector tubes 154, 156, 158, 160, two air supply manifolds 162, 164, the pair of side-by-side nozzles 102, 104 positioned for testing, a thrust measurement table 166, two of six load cell assemblies 168, 170 and a reference table 172.

The pair of side-by-side nozzles 102, 104 are affixed to the thrust measurement table 166 and each, respectively, to one of the air supply manifolds 162, 164, which supplies a stream of pressurized air to the side-by-side nozzles 102, 104 for testing purposes. As air exits from the side-by-side nozzles 102, 104, a thrust vector is generated and transferred to the thrust measurement table 166. The thrust vector is oriented generally downward and parallel to a vertical axis 174 (or z-axis), but also having components normal to the vertical axis 174, in directions parallel to an x-axis 176, or yaw axis, and a y-axis 178, or pitch axis. The x-axis 176 parallels a major axis of the steel table 106, while the y-axis 178 parallels a minor axis of the steel table 106. Knife values (not shown) at the base of each of the side-by-side nozzles 102, 104 can be used in calibrating the noise flow thrust vector measurement bench 100.

Three load cell assemblies affixed between the thrust measurement table 166 and the reference table 172 measure thrust vectors generally downward and parallel to the z-axis 174. Three additional load cell assemblies oriented parallel to the thrust measuring table (normal to the z-axis 174)

measure thrust vectors generated by the side-by-side nozzles generally in a horizontal plane, normal to the z-axis 174, i.e., measure thrust vectors along the x-axis 176 for yaw and the y-axis 178 for pitch. The six load cells also combine to measure moments about each of the three coordinate axes 174, 176, 178.

In order to generate accurate force and moment measurements, it is essential that zero or nearly zero force attributable to the supply of air to the side-by-side nozzles 102, 104 be imposed upon the load cell assemblies, i.e., be imposed on the force measurement table 166. (Any small remaining forces attributable to the supply of air to the side-by-side nozzles 102, 104 are linear as a function of air pressure and can thus easily be eliminated through calibration of the load cells in, for example, a personal computer (not shown) coupled to the six load cells. The personal computer can also be used for performing thrust vector analysis based on load cell outputs.) In order to achieve this zero or nearly zero force, it is important that the air supply manifolds 162, 164, which are connected to the side-by-side nozzles, float independently of the remainder of the air supply. To this end, the externally pressurized air supply bellows 138, 140, 142, 144, 146, 148, 150, 152 act in concert with the air supply manifolds 162, 164 in order to introduce approximately equal amounts of air under pressure into opposing sides of each of the side-by-side nozzles 102, 104, while at the same time providing lateral stability. The objective of such arrangement is to make the side-by-side nozzles 102, 104 appear to the thrust measurement table 166 as having only an exit, i.e., outlet flow with its associated thrust forces, but no inlet flow with its extraneous inlet forces.

Because the air is supplied to the air supply manifolds 162, 164 from opposite sides, side forces from the air supply tend to cancel. A combination of the steel table 106, the support braces 116, 118, the "L" fittings 130, 132, 134, 136 (which are bolted to the support braces 116, 118 as shown) and the strut 120 form a rigid frame that assures that any net lateral forces resultant from the air supply (and namely the externally pressurized air supply bellows 138, 140, 142, 144, 146, 148, 150, 152) are minimized.

Furthermore, the externally pressurized air supply bellows 138, 140, 142, 144, 146, 148, 150, 152 located at each end of each of the connector tubes 154, 156, 158, 160, prevent translation of counter-forces from the "L" fittings 130, 132, 134, 136 and the air supply hoses 122, 124, 126, 128 to the air supply manifolds 162, 164. (These counter-forces would interfere with both the forward and side forces generated by the air emitted from the side-by-side nozzles 102, 104 and thus would tend to mask these forces.) As a result of the externally pressurized air supply bellows 138, 140, 142, 144, 146, 148, 150, 152, preventing translation of these counter-forces, which eliminates any extraneous forces from the air supply and insures that the thrust measured is a result of the air emitted from the side-by-side nozzles 102, 104.

Figure 2:
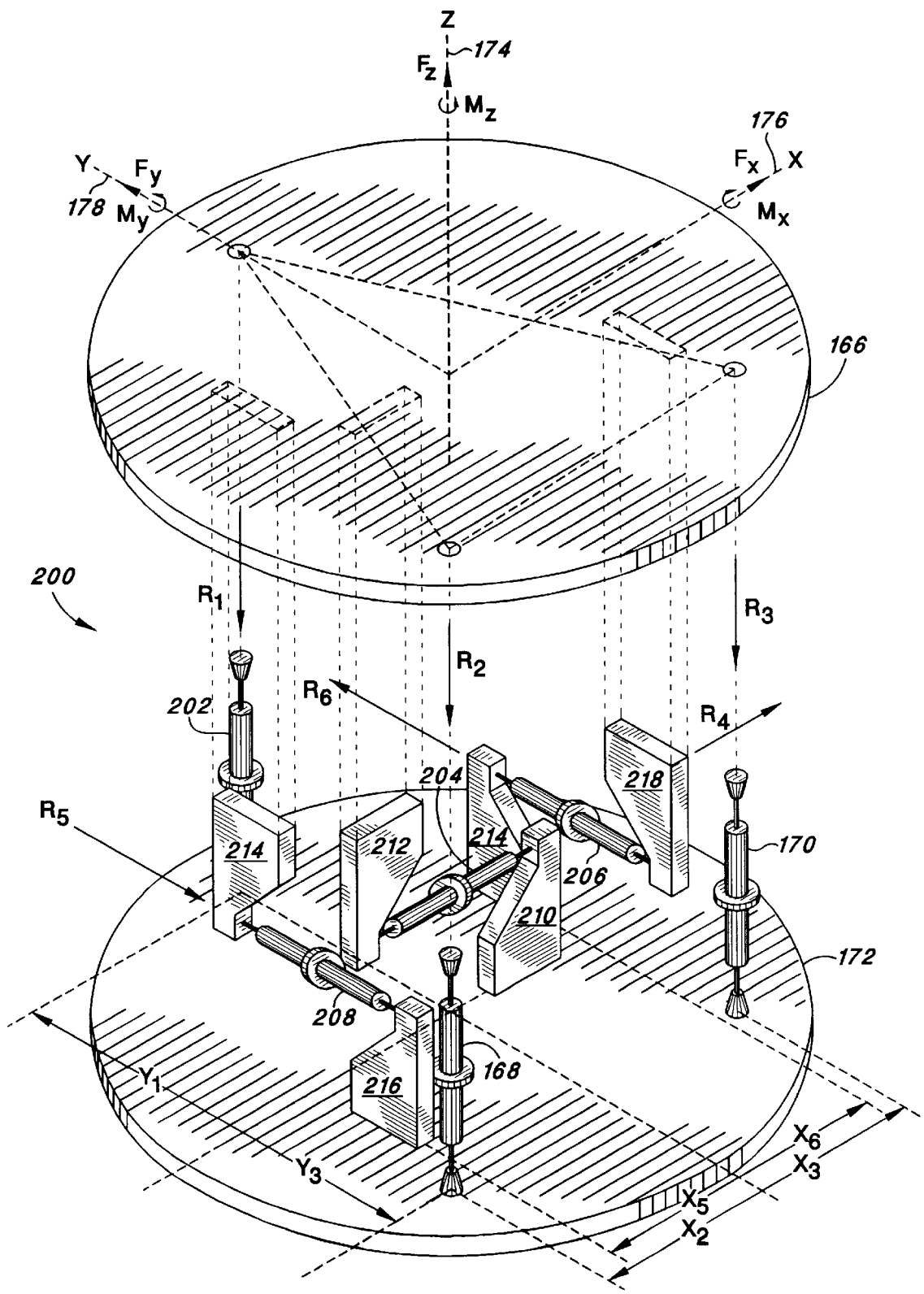
FIG. 2 is a perspective view, partially exploded, of a thrust vector table used in the nozzle thrust vector measurement bench of FIG. 1.

Referring next to FIG. 2, a perspective view is shown of a thrust vector table 200 used in the nozzle thrust vector measurement bench 100 described above, and in the nozzle flow thrust vector measurement benches 700, 900 described below.

Shown is the thrust measurement table 166, the reference table 172, three axial measurement load cell assemblies 168, 170, 202, and three normal measurement load cell assemblies 204, 206, 208, and six braces 210, 212, 214, 216, 218, 220. As shown, the thrust measurement table 166 has been lifted so that the load cell assemblies 168, 170, 202, 204, 206, 208 and braces 210, 212, 214, 216, 218, 220 can be more easily viewed. Dashed lines indicate positions on the force measurement table 116 at which three of the braces 212, 216, 220 are connected to the force measurement table 166, and at which each of the axial measurement load cell assemblies 168, 170, 202 connects to the force measurement table 166.

Each of the load cell assemblies 168, 170, 202, 204, 206, 208 is made up of a load cell, and connecting hardware, described in more detail hereinbelow.

As can be seen, each of the axial measurement load cell assemblies 168, 170, 202 are oriented parallel a major axis 174 of the thrust measuring table (i.e., the z-axis 174). It is these axial measurement load cell assemblies that measure a force $F_z$ in a direction parallel to this major axis 174. The normal measurement load cells measure forces $F_x$, $F_y$ applied to the thrust measuring table along minor axes, i.e., the x-axis 176 and the y-axis 178. Subscripts x, y, and z of the Forces $F_x$, $F_y$, $F_z$ indicate a force along the x-axis 176, y-axis 178 or z-axis 174 respectively.

In addition, the load cells 168, 170, 202, 204, 206, 208 provide respective moments $M_x$, $M_y$, $M_z$ about each of the three coordinate axes 174, 176, 178 (with subscripts x, y and z of the moments $M_x$, $M_y$, $M_z$ indicating a moment about the x-axis 176, y-axis 178 or z-axis 174, respectively).

The three forces $F_x$, $F_y$, $F_z$ and the three moments $M_x$, $M_y$, and $M_z$ are defined as a function of load measurements $R_1$, $R_2$, $R_3$, $R_4$, $R_5$, $R_6$ from respective load cell assemblies 202, 168, 170, 204, 206, 208 and the geometry of the thrust vector table 200, which defines positions $X_2$, $X_3$, $X_5$, $X_6$, $Y_1$, $Y_3$ for the load cell assemblies 168, 170 relative to the major axis 174 (z-axis 174).

The following formulas relate the three forces $F_x$, $F_y$, $F_z$ and the three moments $M_x$, $M_y$, $M_z$ to the load measurements $R_1$, $R_2$, $R_3$, $R_4$, $R_5$, $R_6$ and the positions $X_2$, $X_3$, $X_5$, $X_6$, $Y_1$, $Y_2$. When the load measurements $R_1$, $R_2$, $R_3$, $R_4$, $R_5$, $R_6$ are in compression, the load measurements have positive values.

$$F_x = R_4$$

$$F_y = (R_6 + R_5)$$

$$F_z = -(R_1 + R_2 + R_3)$$

$$M_x = -Y_1 R_1 + Y_3 (R_2 + R_3)$$

$$M_y = -X_2 R_2 + X_3 R_3$$

$$M_z = X_5 R_5 + X_6 R_6$$

Representations of the three forces $F_x$, $F_y$, $F_z$, the three moments $M_x$, $M_y$, $M_z$, the six force measurements $R_1$, $R_2$, $R_3$, $R_4$, $R_5$, $R_6$, and the six positions $X_2$, $X_3$, $X_5$, $X_6$, $Y_1$, $Y_2$ are shown in FIG. 2 as arrows. Directions of the arrows indicate load cell compression.

Completion of the above three forces $F_x$, $F_y$, $F_z$, and the three moments $M_x$, $M_y$, $M_z$, can be performed in accordance with conventional methods, using, for example, a personal computer (not shown) coupled through appropriate lead wires to each of the load cells and through an appropriate analog to digital input interface to the lead wires. Such personal computer arrangements are well known in data acquisition applications.

Referring next to FIG. 3, a cross-sectional view is shown of a pair of externally pressurized air supply bellows 300, 302, and a connector tube 304, such as the externally pressurized air supply bellows 138, 140, 142, 144, 146, 148, 150, 152, and connector tubes 154, 156, 158, 160 used in the nozzle flow thrust vector measurement bench 100, described above.

As shown, one of the externally pressurized air supply bellows 300 connects an outlet 306 of an "L" fitting, such as the "L" fittings 130, 132, 134, 136, to the connector tube 304, and another of the externally pressurized air supply bellows 302 connects an inlet 308 of an air supply manifold, such as the air supply manifolds 162, 164 to the connecting tube 304.

Each of the externally pressurized air supply bellows 300, 302 is made up of a corrugated bellows tube 310, 312 (shown in cross-section) and a pressure collar 314, 316 (also shown in cross-section). One of the pressure collars 314 is affixed to the outlet 306 of the "L" fitting at an outer end 320 of the one pressure collar 314, and another of the pressure collars 316 is affixed to the inlet 308 of the air supply manifold at an outer end 322 of the other pressure collar 316. An inner end 324 of the one pressure collar 314 is affixed at its interior to an inner end 326 of one of the corrugated bellows tube 310. The one corrugated bellows tube 310 resides substantially coaxially within the one pressure collar 314. Similarly, an inner end 328 of the other pressure collar 316 is affixed at its interior to an interior end of another of the corrugated bellows tube 312. Similar to the one corrugated bellows tube 310, the other corrugated bellows tube 312 resides substantially coaxially within the other pressure collar 316. Each of the corrugated bellows tubes 310, 312 is affixed at an interior of a respective inner end 332, 334 to a respective end 336, 338 of the connector tube 304. The respective ends 336, 338 of the connector tube 304 reside substantially coaxially within the respective corrugated bellows tubes 310, 312.

In this way, a substantially air tight passage is formed between the outlet 306 of the "L" fitting and the inlet 308 of the air supply manifold.

As a result of this arrangement, and because the corrugated bellows tubes 310, 312 compress or expand when opposing forces (such as along the x-axis 176) are applied to their ends, and assume a slightly misaligned shape when opposing normal forces (such as along the y-axis 178 or z-axis 174) are applied to their ends, very little or none of these forces is transferred from the inlet 308 of the air supply manifold to the outlet 306 of the "L" fitting. Advantageously, by assuring that little or none of these forces are transferred to the "L" fitting, all or substantially all of the forces acting on the air supply manifold, which are the forces generated by the air exiting the side-by-side nozzles 102, 104, are transferred to the thrust measurement table 166, and, in turn, the load cells.

Referring to FIG. 4, a partial cross-sectional view is shown of the one externally pressurized air supply bellows 300. As shown, the externally pressurized air supply bellows 300 is pressurized, with such pressurization being indicated by arrows. In this pressurized state, the corrugated bellows tube 310 is in tension.

Advantageously, in the externally pressurized state, the corrugated bellows tube 310 remains in tension throughout a range of supply pressures. Any small net air supply forces transmitted to the force measurement table 166 are linear and can be reduced to zero through calibration. If the corrugated bellows tube 310 is not externally pressurized but rather is internally pressurized, the corrugated bellows tube would be in compression and an increase in pressurization causes the corrugated bellows tube to buckle with non-linear force transmission. This non-linearity cannot be reduced to zero through calibration. Thus, advantageously, in accordance with the present embodiment, the corrugated bellows tube is externally pressurized.

Referring next to FIG. 5, shown is an air supply manifold 500 such as the air supply manifolds 162, 164 of the nozzle flow thrust vector measurement bench 100. Shown are first and second inlets 502, 504, a donut-shaped or toroidal manifold body 506, and first and second outlets 508, 510. Also shown is an aft-end view of a nozzle 512, such as one of the side-by-side nozzles 102, 104 of the nozzle flow thrust vector measurement bench 100. In operation, air from the air supply, denoted with arrows, is directed into each of the inlets 502, 504, which lead to the donut-shaped manifold body 506. Inside the donut-shaped manifold body 506, equalization of any discrepancies in pressure between the two inlets 502, 504 occurs. Furthermore, any compressive forces exerted on the inlets 502, 504, as a result of the corrugated bellows tubes 310, 312 being externally compressed under air pressure, are equal or substantially equal on each inlet 502, 504 but in opposite directions.

An air flow from the donut-shaped manifold body 506 is directed to each of the outlet tubes 508, 510 and into the nozzle 512. Because the flow into the outlet tubes 508, 510 is substantially equal in each of the outlet tubes 508, 510, a substantially uniform flow of air is supplied at a lower portion of nozzle 512.

The outlet tubes 508, 510 also serve the important structural function of maintaining the circular integrity of the donut-shaped manifold body 506. As the compressive forces applied at the inlets 502, 504 tend to push opposite sides of the donut-shaped manifold body 506 near the inlet tubes 502, 504 toward one another, adjacent sides near the outlet tubes 508, 510 tend to be pushed outward. The outlet tubes 508, 510 counteract this tendency and maintains the circular integrity of the donut-shaped manifold body 506.

Figure 6:
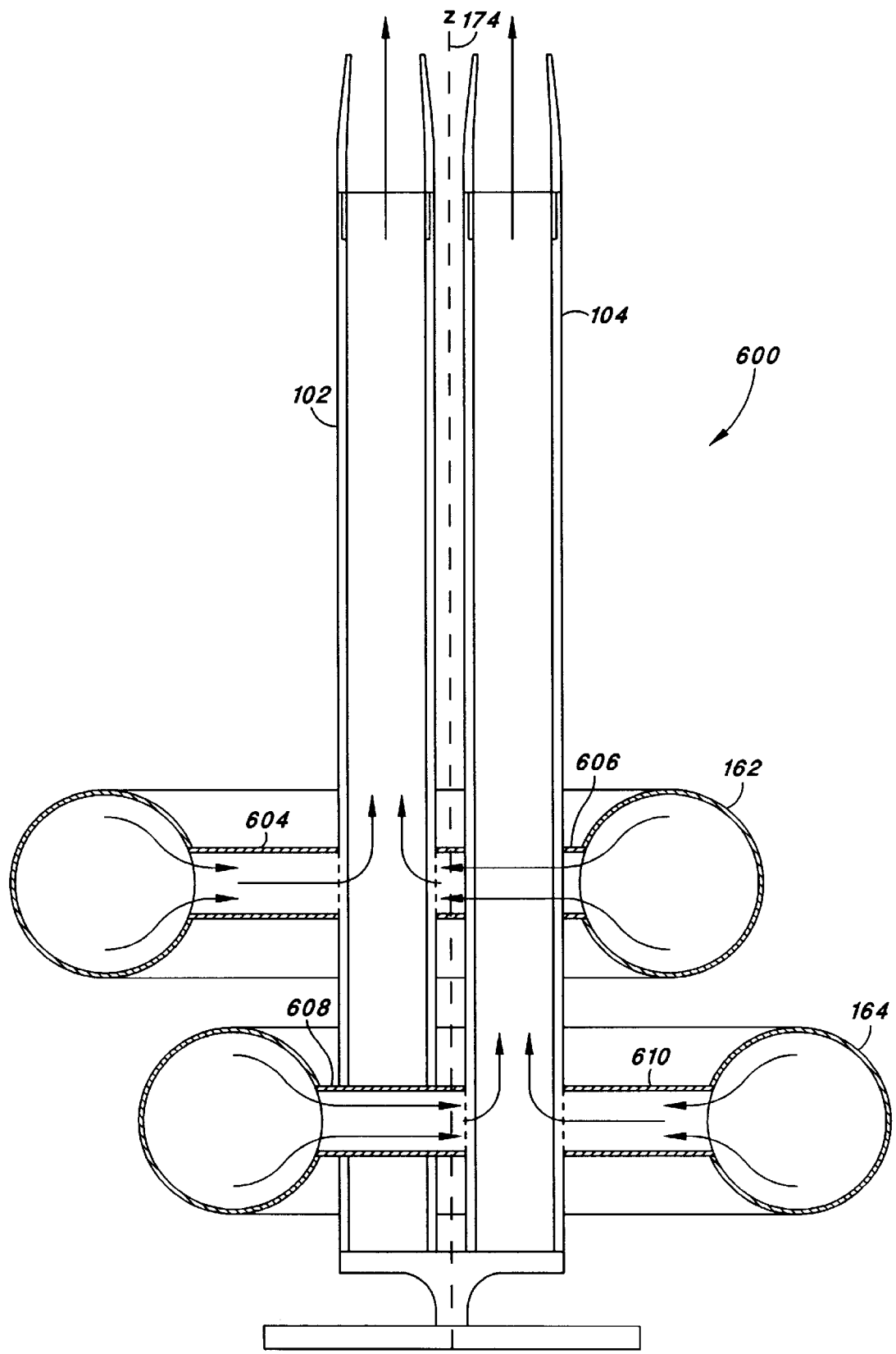
FIG. 6 is a cross-sectional side view of a side-by-side pair of nozzles and a pair of the air supply manifolds of FIG. 5, such as are used in the nozzle flow thrust vector measurement bench of FIG. 1.

Referring next to FIG. 6, a cross-sectional view 600 is shown of the side-by-side pair of nozzles 102, 104 and the pair of the air supply manifolds 162, 164 such as are used in the nozzle flow thrust vector measurement bench 100.

Shown are the two air supply manifolds 162, 164, the pair of side-by-side nozzles 102, 104 positioned for testing, and a bracket 602 onto which the side-by-side nozzles 102, 104 are mounted and to which is mounted the thrust measurement table 166. Each one of the pair of side-by-side nozzles 102, 104 is affixed to one of the air supply manifolds 162, 164, which supply a stream of pressurized air (depicted by arrows) to the respective one of the side-by-side nozzles 102, 104 for testing purposes. As air (depicted by arrows) is forced out of the side-by-side nozzles 102, 104, a thrust vector is generated and transferred to the bracket 602, which in turn transfers the thrust vector to the thrust measurement table 166. The thrust vector is oriented generally downward and close to parallel to the vertical axis 174 (or z-axis), but also has components in directions parallel to the x-axis 176 (or yaw axis) (FIG. 1 ) and the y-axis 178 (or pitch axis) (FIG. 1). The degree to which the thrust vector produces the normal components is a function of the particular design of the test nozzle, in this case the side-by-side nozzles 102, 104.

Because the air is supplied to the air supply manifolds 162, 164 from opposite sides (roughly into and out of the paper in FIG. 6), side forces from the air supply tend to cancel. In addition, compressive forces applied by the air supply to the air supply manifolds 162, 164 are distributed around the air supply manifolds 162, 164 and result in tension forces to the outlets 604, 606, 608, 610 of each of the air supply manifolds 162, 164.

Figure 7:
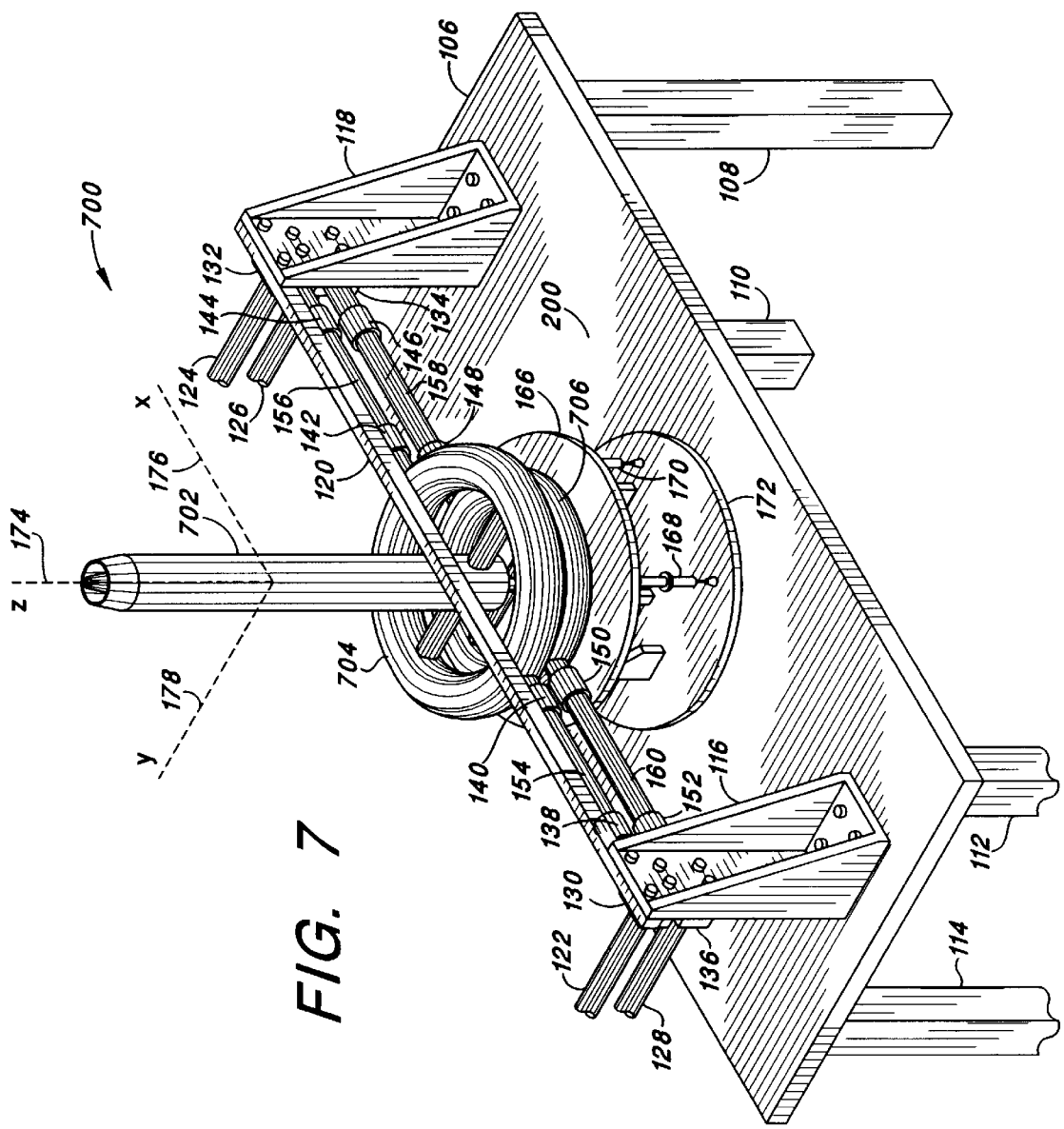
FIG. 7 is a perspective view of a nozzle flow thrust vector measurement bench in accordance with another embodiment of the present invention with a high bypass nozzle positioned for testing.

Referring next to FIG. 7, a perspective view is shown of a nozzle flow thrust vector measurement bench 700 in accordance with another embodiment of the present invention with a high bypass nozzle 702 positioned for testing. Shown are the steel table 106 supported on the four legs 108, 110, 112, 114, the pair of support braces 116, 118, the strut 120, the four supply hoses 122, 124, 126, 128, the four "L" fittings 130, 132, 134, 136, the eight externally pressurized air supply bellows 138, 140, 142, 144, 146, 148, 150, 152, the four connector tubes 154, 156, 158, 160, two air supply manifolds 704, 706, the high bypass nozzle 702 positioned for testing, the thrust measurement table 166, two of six load cell assemblies 168, 170 and the reference table 172.

The high bypass nozzle 702 is affixed to the thrust measurement table 166 and to the air supply manifolds 704, 706, which supply streams of pressurized air to the high bypass nozzle 702 for testing purposes. As air is forced out of the high bypass nozzle 702, the thrust vector is generated and transferred to the thrust measurement table 166. The thrust vector is oriented generally downward and parallel to a vertical axis 174 (or z-axis), but also has components normal to the z-axis 174, in directions parallel to the x-axis 176 and the y-axis 178. A weight hanger (not shown) suspended from the thrust measured table 166 and passing through a hole (not shown) in the reference table 172 can be used along with various weights (not shown) in calibrating the six load cells of the nozzle flow thrust vector measurement bench 100.

Three load cell assemblies affixed between the thrust measurement table 166 and the reference table 172 measure thrust vectors generally downward and parallel to the z-axis 174. Three additional load cell assemblies oriented parallel to the thrust measuring table (normal to the z-axis 174) measure thrust vectors generated by the high bypass nozzle generally in a horizontal plane, normal to the z-axis 174 and along the yaw and pitch axes. The six load cells also combine to measure moments about each of the three coordinate axes 174, 176, 178.

As with the embodiment of FIG. 1, in order to generate accurate force and moment measurements, it is important that zero or nearly zero force attributable to the supply of air to the high bypass nozzle 702 be "seen" as imposed upon the load cell assemblies, i.e., be imposed on the force measurement table 166 and not removed through calibration. In order to achieve this end, it is important that the air supply manifolds 704, 706, which are connected to the high bypass nozzle 702, float independently of the remainder of the air supply. To this end, the externally pressurized air supply bellows 138, 140, 142, 144, 146, 148, 150, 152 act in concert with the air supply manifolds 704, 706 in order to introduce approximately equal amounts of air under pressure into opposing sides of the high bypass nozzle 702 while at the same time providing lateral stability to the externally pressurized air supply bellows. The objective of such arrangement is to make the high bypass nozzles 702, appear to the thrust measurement table 166 as having only an exit, i.e., outlet flow, and no entrance flow, or inlet flow.

Because the air is supplied to the air supply manifolds 704, 706 from opposite sides, side forces from the air supply tend to cancel. In addition, compressive forces applied by the air supply to the air supply manifolds 704, 706 are distributed around the air supply manifolds 704, 706 and result in uniform air flow to the high bypass nozzles 702. Furthermore, the externally lo pressurized air supply bellows 138, 140, 142, 144, 146, 148, 150, 152 located at each end of each of the connector tubes 154, 156, 158, 160, prevent translation of forces from each of the connector tubes 154, 156, 158, 160 the "L" fittings 130, 132, 134, 136 (which are bolted respectively to the support braces 116, 117, as shown) and the air supply hoses 122, 124, 126, 128 to the air supply manifolds 704, 706. As a result, none or extremely little of the force generated by the air exiting from the high bypass nozzle 702 is borne by the air supply, assuring that all or nearly all of such force is applied to the thrust measurement table 166.

A combination of the steel table 106, the support braces 116, 118, and the strut 120 form a rigid frame that assures that any lateral forces resultant from the air supply cancel with opposite forces from the rigid frame.

Figure 8:
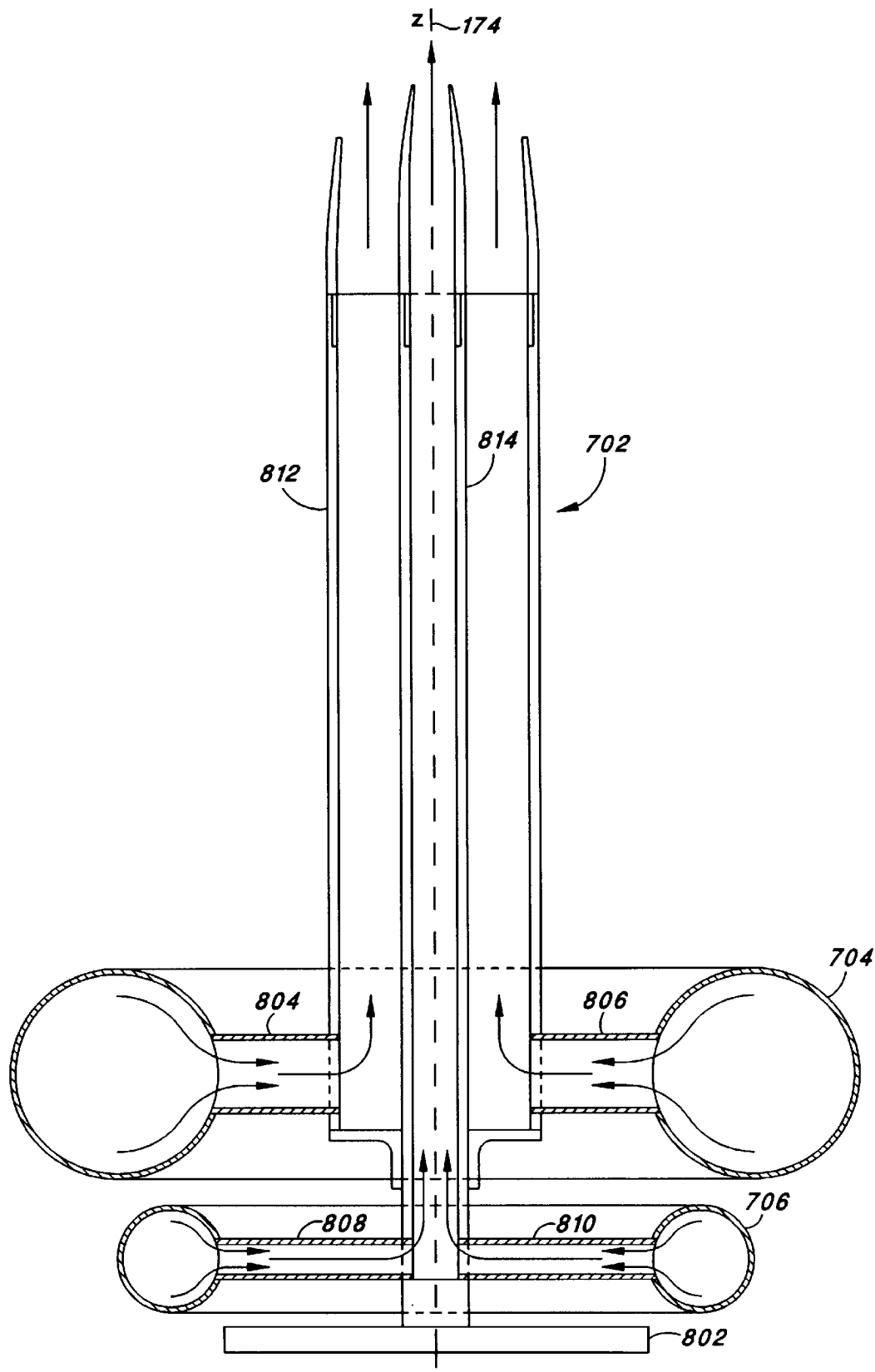
FIG. 8 is a cross-sectional view of a high bypass nozzle and a pair of the air supply manifolds of FIG. 5 such as are used in the nozzle flow thrust vector measurement bench of FIG. 7.

Referring next to FIG. 8, a cross-sectional view is shown of a high bypass nozzle 702 and a pair of the air supply manifolds 704, 706 such as are used in the nozzle flow thrust vector measurement bench. Shown are the two air supply manifolds 704, 706, the high bypass nozzle 702 positioned for testing, and a bracket 802 onto which the high bypass nozzle 702 is mounted and to which is mounted the thrust measurement table 166.

The high bypass nozzle 702 consists of an outer nozzle 812 and an inner nozzle 814, and is affixed to the air supply manifolds 704, 706, which supply streams of pressurized air (depicted by arrows) to the outer (or low pressure) nozzle 812 and the inner (or high pressure) nozzle 814. The streams of air enter the low pressure nozzle 812 and the high pressure nozzle 814 through respective outlet tubes 804, 806, 808, 810 of the air supply manifolds 704, 706. As air (depicted by arrows) is forced out of the high bypass nozzle 702 a thrust vector is generated and transferred to the bracket 802, which in turn transfers the thrust vector to the thrust measurement table 166. The thrust vector is oriented generally downward and parallel to the vertical axis 174 (or z-axis), but also has components normal to the z-axis 174, in directions parallel to the x-axis 176 (FIG. 7) and the y-axis 178 (FIG. 7).

Because the air is supplied to the air supply manifolds 704, 706 from opposite sides (into and out of the paper in FIG. 8), side forces from the air supply tend to cancel. In addition, compressive forces applied by the air supply to the air supply manifolds 704, 706 are distributed around the air supply manifolds 704, 706 and result in tension forces to the outlets 804, 806, 808, 810 of each of the air supply manifolds 704, 706.

Figure 9:
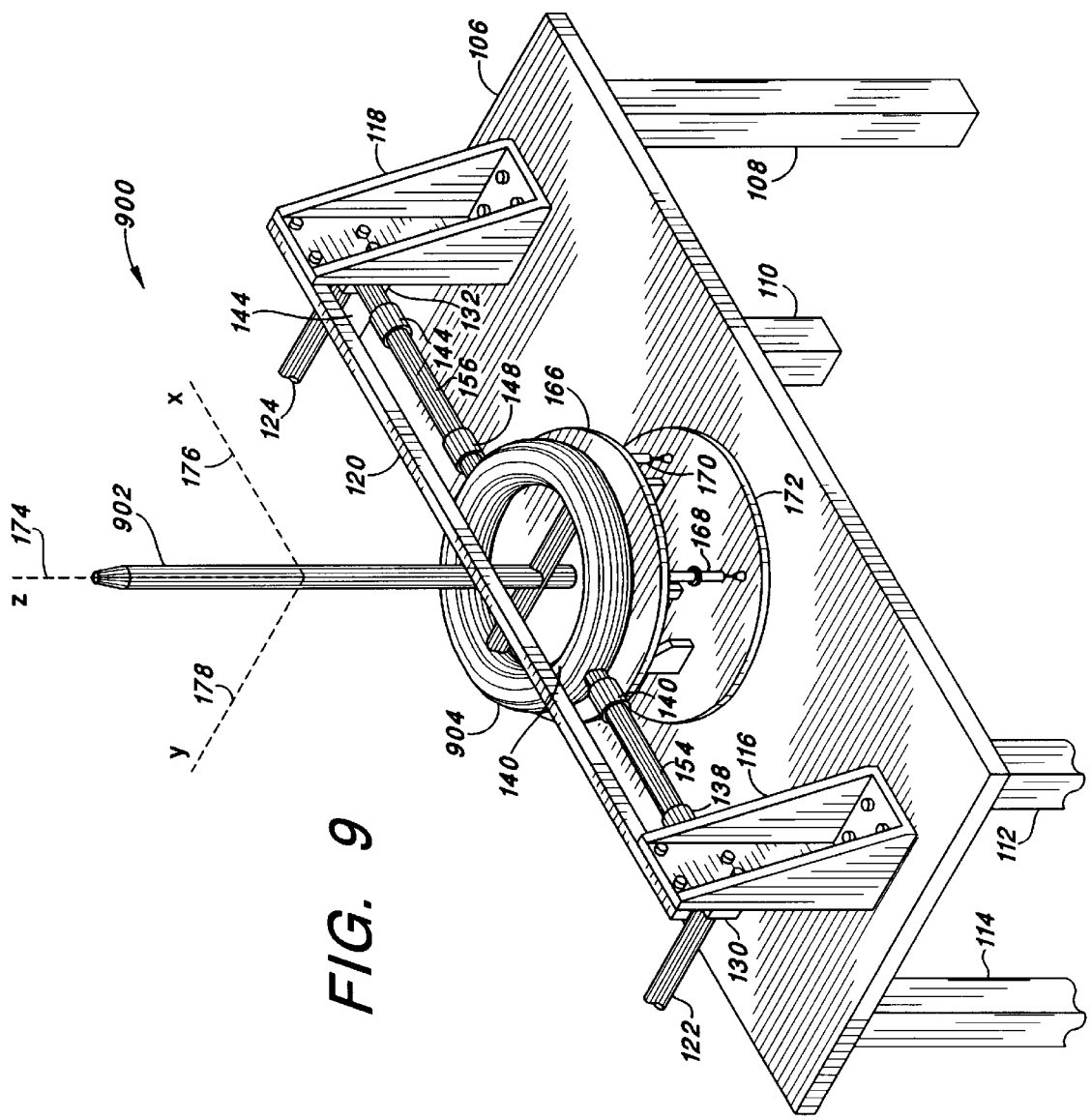
FIG. 9 is a perspective view of a nozzle flow thrust vector measurement bench in accordance with a further embodiment of the present invention with a single nozzle positioned for testing.

Referring next to FIG. 9, a perspective view is shown of a nozzle flow thrust vector measurement bench 900 in accordance with a further embodiment of the present invention with a single nozzle 902 positioned for testing. Shown are the steel table 106 supported on the four legs 108, 110, 112, 114, the pair of support braces 116, 118, the strut 120, two supply hoses 122, 124, two "L" fittings 130, 132, the four externally pressurized air supply bellows 138, 140, 142, 144, two connector tubes 154, 156, an air supply manifold 904, the single nozzle 902 positioned for testing, the thrust measurement table 166, two of six load cell assemblies 168, 170 and the reference table 172.

The single nozzle 902 is affixed to the thrust measurement table 166 and to the air supply manifold 904, which supplies a stream of pressurized air to the single nozzle 902, for testing purposes. As air is forced out of the single nozzle 902, a thrust vector is generated and transferred to the thrust measurement table 166. As with the above-described embodiments, the thrust vector is oriented generally downward and parallel to a vertical axis 174 (or z-axis), but also has components normal to the z-axis 174, in directions parallel to an x-axis 176 and a y-axis 178.

As above, three load cell assemblies affixed between the thrust measurement table 166 and the reference table 172 measure thrust vectors generally downward and parallel to the z-axis 174. Three additional load cell assemblies oriented parallel to the thrust measurement table 166 (normal to the z-axis 174, i.e., along the yaw and pitch axes) measure thrust vectors generated by the single nozzle generally in a horizontal plane, normal to the z-axis 174. The six load cells also combine to measure moments about each of the three coordinate axes 174, 176, 178.

In order to generate accurate force and moment measurements, as with the above embodiments, it is essential that zero or nearly zero force attributable to the supply of air to the single nozzle 902, be imposed upon the load cell assemblies, i.e., be imposed on the force measurement table 166. In order to achieve this end, the air supply manifold 904, which is connected to the single nozzle 902, floats independently of the remainder of the air supply. To this end, the externally pressurized air supply bellows 138, 140, 142, 144 act in concert with the air supply manifold 904 in order to introduce approximately equal amounts of air under pressure into opposing sides of the single nozzle 902, while at the same time providing lateral stability to the externally pressurized air supply bellows 138, 140, 142, 144. As with the above-described embodiments, the objective of such arrangement is to make the single nozzle 902 appear to the thrust measurement table 166 as having only an exit, i.e., outlet flow, and no entrance flow, or inlet flow and such objective is achieved substantially as described above.

Figure 10:
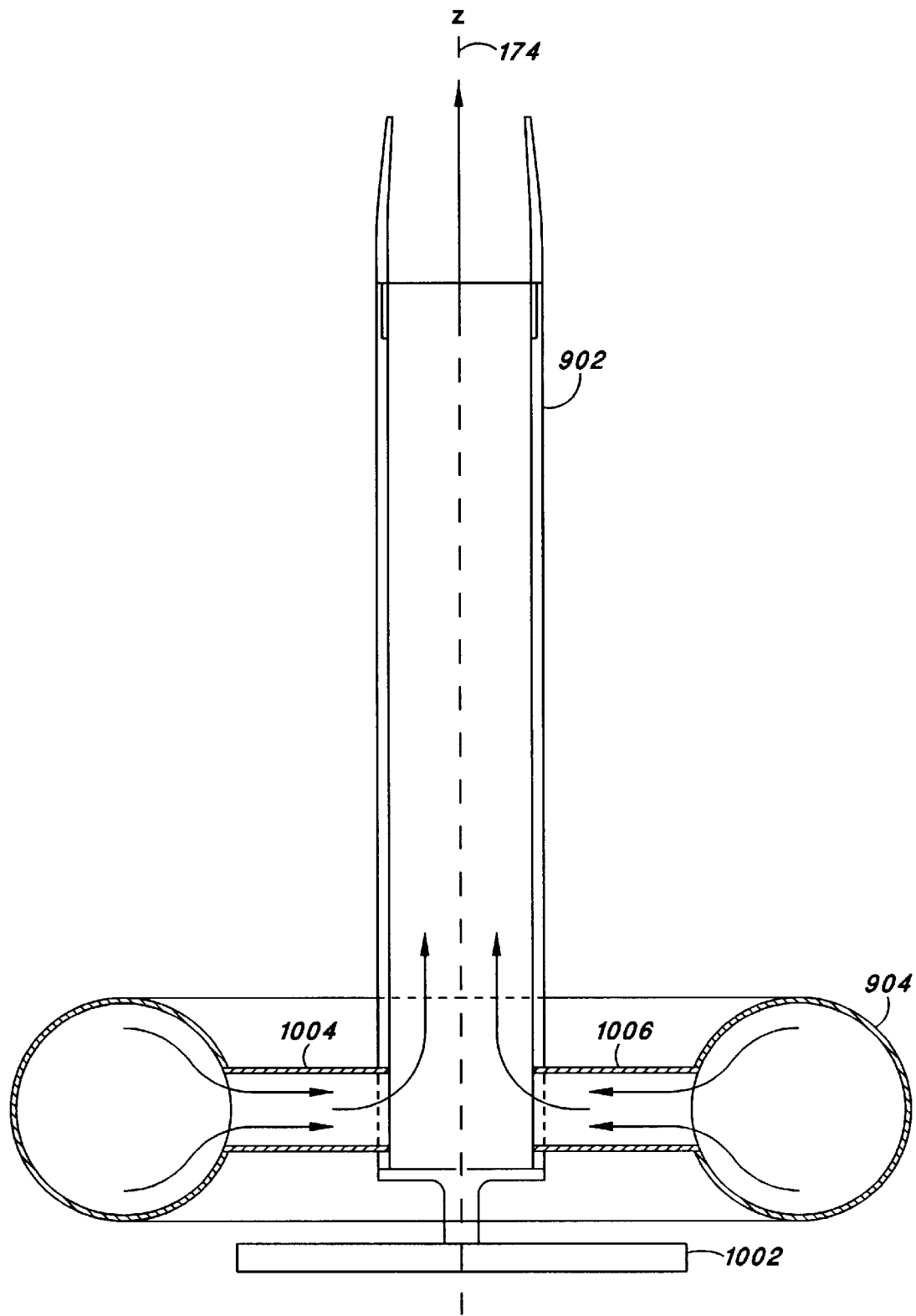
FIG. 10 is a cross-sectional view of a single nozzle and the air supply manifold of FIG. 5 such as is used in the nozzle flow thrust vector measurement bench of FIG. 9.

Referring next to FIG. 10, a cross-sectional view is shown of the single nozzle 902 and the air supply manifold 904 such as is used in the nozzle flow thrust vector measurement bench 900. Shown are the air supply manifold 904, the single nozzle 902 positioned for testing, and a bracket 1002 onto which the single nozzle 902 is mounted and to which is mounted the thrust measurement table 166.

The single nozzle 902 is affixed to the air supply manifold 904 which supplies a stream of pressurized air (depicted by arrows) to the single nozzle 902 for testing purposes. Such air is supplied to the single nozzle 902 through outlet tubes 1004, 1006. As air (depicted by arrows) is forced out of the single nozzle 902, a thrust vector is generated and transferred to the bracket 1002, which in turn transfers the thrust vector to the thrust measurement table 166. The thrust vector is oriented generally downward and parallel to the vertical axis 174 (or z-axis), but also has components normal to the z-axis 174, in directions parallel to the x-axis 176 (or yaw axis) (FIG. 9) and the y-axis 178 (or pitch axis) (FIG. 9).

Because the air is supplied to the air supply manifold 904 from opposite sides (into and out of the paper in FIG. 10), side forces from the air supply tend to cancel as in the above-described embodiments. In addition, compressive forces applied by the air supply to the air supply manifold 904 are distributed around the air supply manifold 904 and result in tension forces to the outlets 1004, 1006 of the air supply manifold 904.

Figure 11:
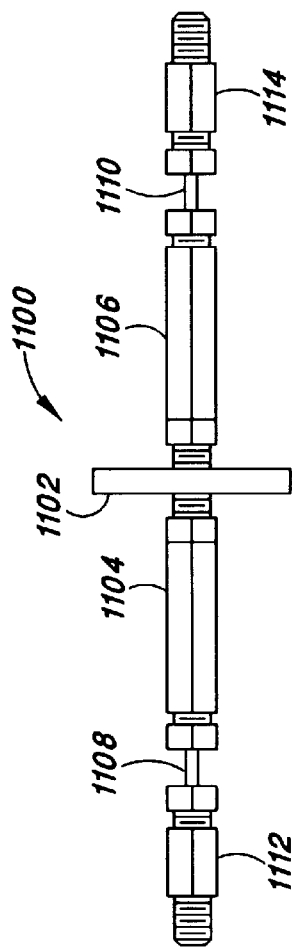
FIG. 11 is a side view of a load cell assembly used in the embodiments of the nozzle flow thrust vector measurement bench of FIGS. 1, 7 and 9.

Referring next to FIG. 11, a side view is shown of a load cell assembly 1100 such as the load cell assemblies 168, 170, 202, 204, 206, 208 used in the embodiments of the nozzle flow thrust vector measurement bench. Shown is a load cell 1102, first and second compression fittings 1104, 1106 coupled to the load cell 1102, first and second wires 1108, 1110 coupled at respective proximal ends to the first and second compression fittings 1104, 1106, and third and fourth compression fittings 1112, 1114 also coupled to respective distal ends of the first and second wires 1108, 1110. The third and fourth compression fittings 1112, 1114 are connected to the thrust measurement table and the reference table, respectively, such as in the lo case of the axial load cells or to perspective support brackets such as in the case of the normal load cells.

Figure 12:
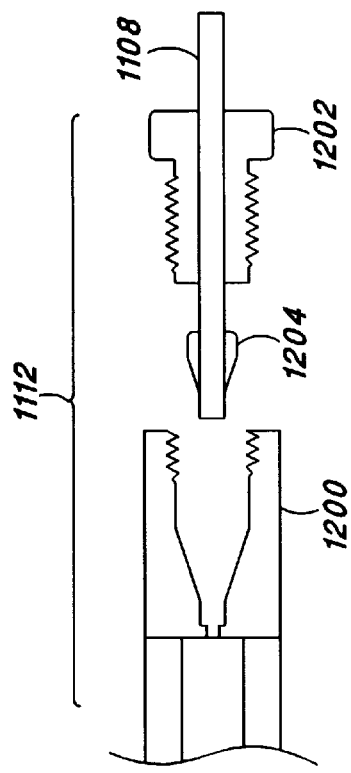
FIG. 12 is a side view, partially in cross-section, of a compression fitting used in the load cell assembly of FIG. 11.

Referring to FIG. 12 a side view is shown, partially in cross-section, of the third compression fitting 1112 used in the load cell assembly 1100. Shown is the third compression fitting 1112 and the first wire 1108. The compression fitting 1112 employs a fitting body 1200, a compression nut 1202 and a ferrule 1204. This compression fitting is of a type commonly known to the skilled artisan, and therefore further explanation is not made herein. However, it is important to recognize the important result achieved by employing such compression fittings in the present context. Specifically, if, for example, a set screw were employed instead of the compression fitting 1112, error would be introduced into measurements taken by the load cells, as a result of force errors created due to the fact that the set screw squeezes the wire only on two sides, rather than uniformally squeezing around its entire periphery, as with the compression fittings shown. By employing the compression fitting, this problem is preferably avoided.

While the invention herein disclosed has been described by means of specific embodiments and applications thereof, numerous modifications and variations could be made thereto by those skilled in the art without departing from the scope of the invention set forth in the claims.

What is claimed is:

1. A nozzle flow thrust vector measurement system comprising:
   a thrust vector table comprising:
      a thrust measurement table;
      a reference table; and
      at least three load cell assemblies coupled to the thrust measurement table and the reference table;
   a gas supply system comprising:
      a gas supply conduit substantially fixed relative to the reference table;
      a gas supply manifold substantially fixed relative to the thrust vector table; and
      a zero force connecting system coupled between the air supply conduit and the gas supply manifold, wherein the zero force connecting system applies substantially zero net force to the gas supply manifold allowing substantially all force applied to the thrust vector table to act on said load cell assemblies.

2. The nozzle flow thrust vector measurement system of claim 1 further comprising:
   a test nozzle coupled to the thrust vector table.

3. The nozzle flow thrust vector measurement system of claim 2 wherein said test nozzle is coupled to said gas supply manifold, and receives a supply of gas under pressure from said gas supply manifold.

4. The nozzle flow thrust vector measurement bench of claim 3 wherein said gas supply manifold further comprises:
   a toroidal manifold body;
   a first inlet coupled between said zero force connecting system and said toroidal manifold body;
   a first outlet coupled between said toroidal manifold body and said test nozzle.

5. The nozzle flow thrust vector measurement system of claim 4 wherein said first inlet is coupled to said toroidal manifold body, and extends radially outward from said toroidal manifold body, and wherein said first outlet is coupled to said toroidal manifold body, and extends radially inward from said toroidal manifold body.

6. The nozzle flow thrust vector measurement bench of claim 5 further including:
   a second inlet coupled between said zero force connecting system and said toroidal manifold body, and extending radially outward from toroidal manifold body; and
   a second outlet coupled between said toroidal manifold body and said text nozzle, and extending radially inward from said toroidal manifold body.

7. The nozzle flow thrust vector measurement bench of claim 6 wherein said first and second inlets extend radially outward from said toroidal manifold body sharing a common major outlet axis, and wherein said first and second outlets extend radially inward from said toroidal manifold body sharing a common major inlet axis.

8. The nozzle flow thrust vector measurement bench of claim 7 wherein said common major outlet axis is normal to said common major inlet axis.

9. The nozzle flow thrust vector measurement bench of claim 3 wherein said zero force connecting system comprises:
a first externally pressurized air supply bellows coupled to said gas supply conduit and a remainder of said zero force connecting system.

10. The nozzle flow thrust vector measurement bench of claim 9 wherein said remainder of said zero force connecting system comprises:
a second externally pressurized air supply bellows coupled to said gas supply manifold; and
a connector tube coupled between said first externally pressurized gas supply bellows and said gas supply conduit.

11. The nozzle flow thrust vector measurement bench of claim 9 wherein said first externally pressurized gas supply bellows comprises:
a pressure collar coupled to said gas supply manifold; and
a corrugated bellows tube coupled between said pressure collar and said remainder of said zero force connecting system.

12. The nozzle flow thrust vector measurement bench of claim 11 wherein said corrugated bellows tube is substantially coaxial with and positioned within said pressure collar.

13. The nozzle flow thrust vector measurement bench of claim 3 wherein said at least three load cell assemblies comprise:
a first load cell assembly coupled between said thrust measurement table and said reference table, said first load cell assembly having a major axis substantially parallel with a major axis of said thrust vector table;
a second load cell assembly coupled between said thrust measurement table and said reference table, said second load cell assembly having a major axis substantially parallel with a major axis of said thrust vector table;
a third load cell assembly coupled between said thrust measurement table and said reference table, said third load cell assembly having a major axis substantially parallel with a major axis of said thrust vector table;
a fourth load cell assembly coupled between said thrust measurement table and said reference table, said fourth load cell assembly having a major axis substantially normal to a major axis of said thrust vector table;
a fifth load cell assembly coupled between said thrust measurement table and said reference table, said fifth load cell assembly having a major axis substantially normal to a major axis of said thrust vector table; and
a sixth load cell assembly coupled between said thrust measurement table and said reference table, said sixth load cell assembly having a major axis substantially normal to a major axis of said thrust vector table.

14. The nozzle flow thrust vector measurement system of claim 13 wherein each of said at least three load cell assemblies comprises:
a load cell;
a compression fitting coupled to the load cell; and
a wire coupled to the compression fitting.

15. A method of nozzle flow thrust vector measurement comprising:
mounting a nozzle on a thrust vector table;
supplying a gas to a nozzle through a zero force connecting system wherein substantially zero net force is applied to the thrust vector table;
measuring load on each of a plurality of load cells;
removing any remaining force applied to the thrust vector table by the zero force connecting system through calibration;
determining an amount of force against the thrust vector table as a result of a gas exiting the nozzle; and
determining an amount of a moment exerted on the thrust vector table as a result of the gas exiting the nozzle.

16. The method of claim 15 wherein said measuring load includes measuring load on each of at least three load cells.

17. The method of claim 16 wherein said measuring load includes measuring load on each of six load cells.

18. The method of claim 17 wherein said determining of said amount of force exerted comprises determining an amount of force along a thrust axis, and determining an amount of force along at least two other axes normal to the thrust axis.

19. The method of claim 18 comprising:
measuring first, second, third, fourth, fifth and sixth load measurements $R_1$, $R_2$, $R_3$, $R_4$, $R_5$, $R_6$;
determining an amount of force along a first axis $F_x$;
determining an amount of force along a second axis $F_y$;
determining an amount of force along a third axis $F_z$;
determining an amount of a moment about the first axis $M_x$;
determining an amount of a moment about the second axis $M_y$; and
determining an amount of a moment about the third axis $M_z$.

20. The method of claim 19 wherein:
said determining said amount of said force along said first axis includes computing:
$F_x = R_4$, where $R_4$ is a fourth load measurement and $F_x$ is said amount of said force along said first axis;
said determining said amount of said force along said second axis includes completing:
$F_y = R_5 = R_6$, where $R_5$ is a fifth load measurement, $R_6$ is a sixth load measurement and $F_y$ is said amount of said force along said second axis;
said determining said amount of said force along said third axis includes computing:
$F_z = R_1 = R_2 = R_3$, where $R_1$ is a first load measurement, $R_2$ is a second load measurement, $R_3$ is a third load measurement, and $F_z$ is said amount of said force along said third axis;
said determining said amount of said moment about said first axis includes computing:
$M_x = Y_1 R_1 = Y_3 (R_2 + R_3)$ where $Y_1$ is a first moment arm, $Y_3$ is a second moment arm and $M_x$ is said amount of said moment about said first axis;
said determining said amount of said moment about said second axis includes computing:
$M_y = X_2 R_2 = X_3 R_3$ where $X_2$ is a third moment arm, $X_3$ is a fourth moment arm and $M_y$ is said amount of said moment about said second axis; and
said determining said amount of said moment about said third axis includes computing:
$M_z = X_5 R_5 = X_6 R_6$ where $X_5$ is a fifth moment arm, $X_6$ is a sixth moment arm and $M_z$ is said amount of said moment about said third axis.

* * * * *